Patented Dec. 26, 1944

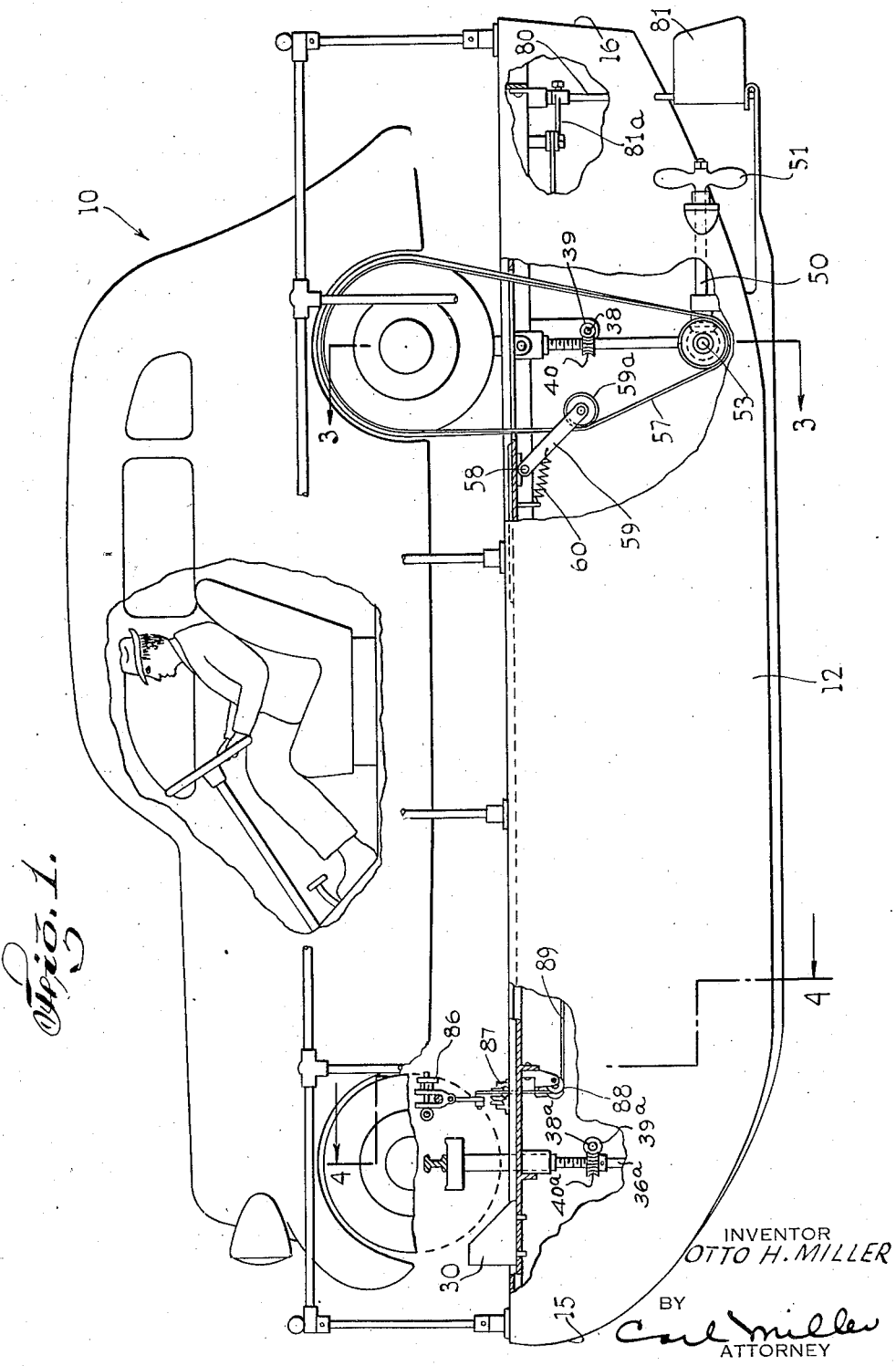

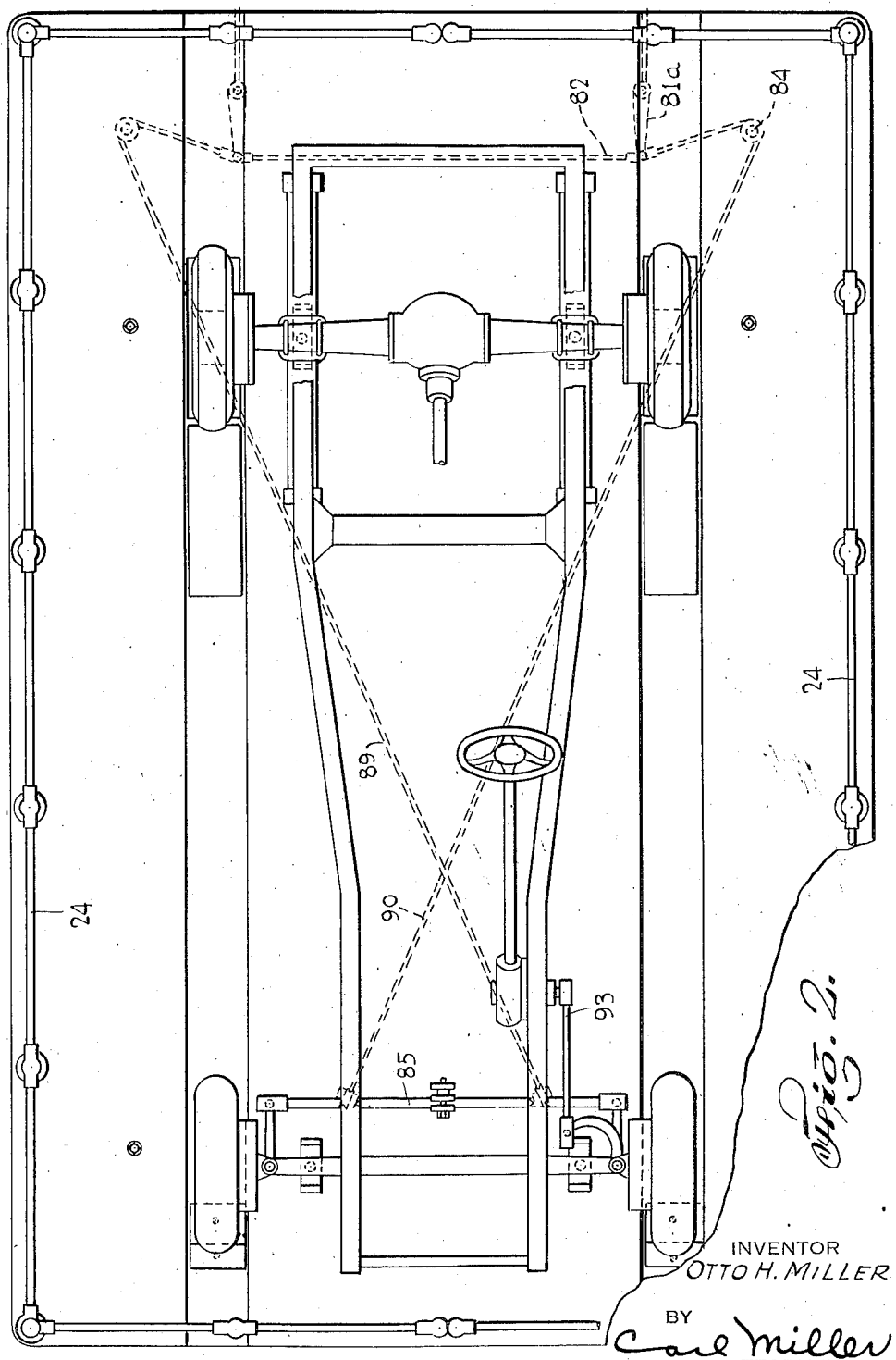

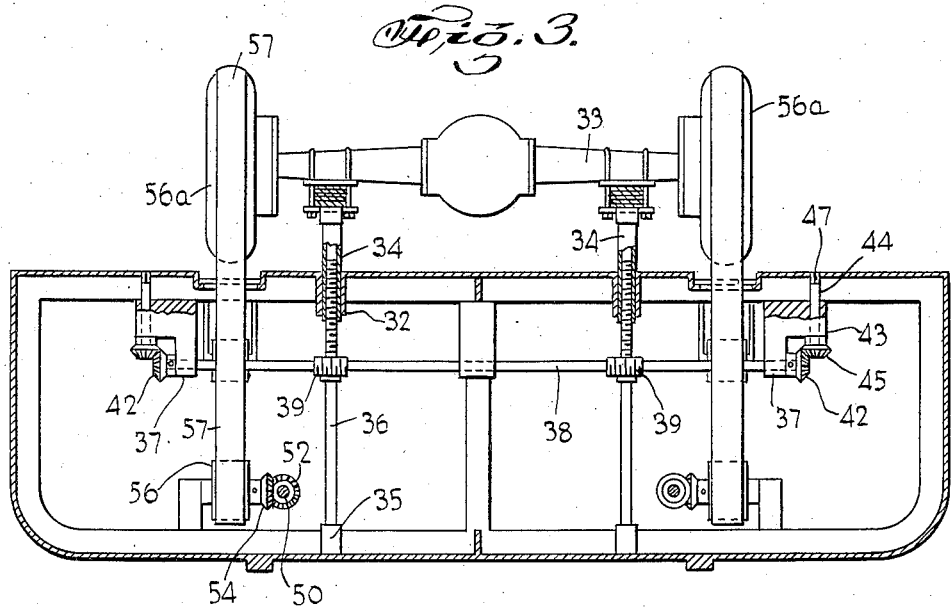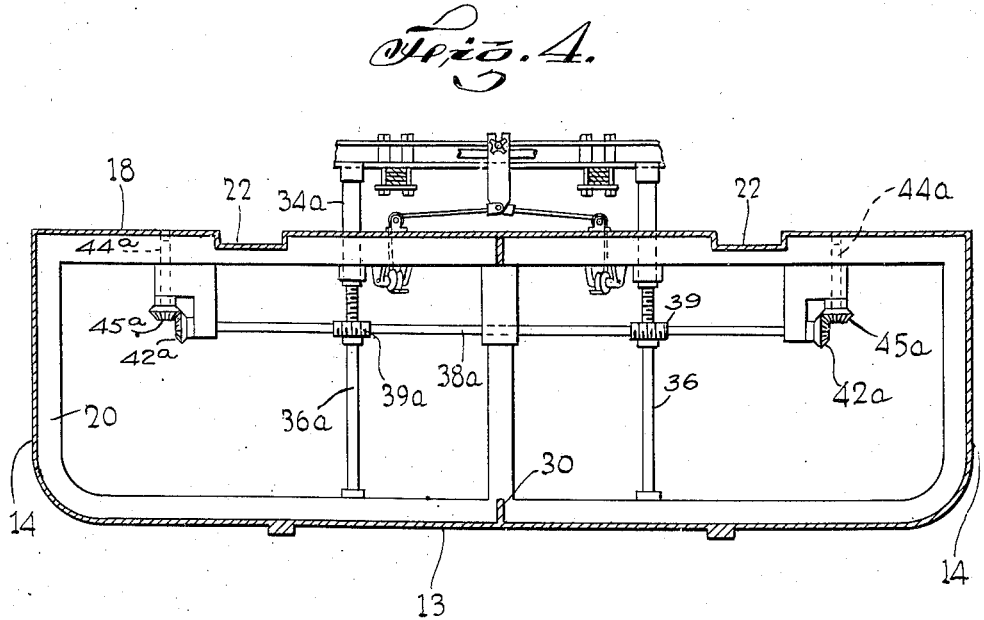

2,365,830

UNITED STATES PATENT OFFICE 2,365,830

BOAT OPERATED BY MOTIVE VEHICLE

Otto H. Miller, Union City, N. J.

Application September 27, 1943, Serial No. 503,897

2 Claims. (Cl. 115—0.5)

This invention relates to boats operated by motive vehicles.

An object of this invention is to provide a boat in the form of a float onto which an automobile or other motive vehicle may be run, means being provided to connect the vehicle to the boat and for propelling the boat by power generated in the vehicle motor.

In accordance with the present invention, an automobile or other motive vehicle may be run onto the float and jacked up on the float. Belts are then mounted to connect the rear wheels with pulleys within the float, said pulleys being connected to propellers, whereby the float may be propelled through power obtained through the rear wheels of the vehicle and under the control of the operator sitting in the usual operator's seat in the vehicle.

Yet a further object of this invention is to provide means connectible to the front axle of the vehicle, whereby the float may be steered by the steering wheel of the vehicle.

Yet another object of this invention is to provide a durable boat operated by a vehicle motor, which shall be relatively inexpensive to manufacture, easy to manipulate, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a side elevational view of a boat with a vehicle mounted thereon, and embodying the invention;

Fig. 2 is a top plan view of the vehicle frame on the float or boat;

Fig. 3 is a cross-sectional view taken on line 3—3 of Fig. 1; and

Fig. 4 is a cross-sectional view taken on line 4—4 of Fig. 1.

Referring now in detail to the drawings 10 designates a boat or float adapted to be operated by the motor of an automobile or other motive vehicle 11. The boat 10 is in the form of a float or tank 12 comprising a flat bottom wall 13, side walls 14, a front wall 15 and a rear wall 16. The bottom wall may be curved upwardly towards the front and also curved upwardly toward the rear. The float also comprises a top wall 18, and is preferably air tight.

The tank or float may be made of sheet metal reinforced on the inside by reinforcing flanges 20 of any suitable type.

The top wall 18 may be provided with a pair of longitudinally depressed portions 22 serving as a runway for the vehicle to guide the vehicle onto the float. Any suitable railings 24 may be provided on top of the float.

The vehicle 11 is run forwardly onto the float until it contacts stops 30 at the front of the float. The automobile is then in position for connection to parts of the boat, as will appear hereinafter.

Means is provided to jack up the vehicle so that the rear wheels may be removed. To this end, the top wall 18 of the tank is formed with a pair of vertical sleeves 32 located beneath the rear axle 33 of the vehicle. Slidably and non-rotatably mounted within the sleeves 32 are internally screw threaded jack members 34 adapted to engage beneath the rear axles. Rotatably mounted within the bearings 35, located in bottom wall of the tank, and directly beneath the sleeves 32, are vertical screw members 36, the upper ends whereof have screw threaded engagement within the jack members 34. Thus, rotation of the screw members 36 will cause the jacks 34 to rise for lifting up the rear end of the car.

Mounted on suitable bearings 37 within the tank, is a horizontal shaft 38 carrying worms 39 meshing with worm wheels 40 on the screws 36. At the ends of shaft 38 are beveled gears 42. Rotatably mounted in bearings 43 within the tank are vertical shafts 44 carrying at their lower ends beveled gears 45 meshing with the beveled gears 42.

The upper ends 47 of shafts 44 are polygonal, and the top wall 18 recessed so that a wrench may be applied to said polygonal heads for rotating the shafts 44. Thus, by rotating either one of the shafts 44, both jacks 34 will rise or fall depending upon the direction of rotation. The front axle of the vehicle may be lifted likewise by similar jacks 34a located beneath the front axle and slidable in sleeves in the top wall 18 receiving the screw threads of vertical shafts 36a journalled within the tank.

The screw shafts 36a likewise carry worm wheels 40a meshing with worms 39a on a cross shaft 38a carrying beveled gears 42a. The bevels 42a likewise mesh with beveled gears 45a on vertical shafts 44a, having square heads at the upper ends thereof.

It will now be understood that the car may be jacked up by using the usual wrench which is carried as equipment by the vehicle. In other words, the same wrench which is used to remove the wheels of the car may be used for jacking up the car on the float. After the car is jacked up, the rear wheels may be removed in the usual way.

Means is provided for propelling the float by the motor of the vehicle. To this end, the float is provided with a pair of horizontal longitudinally extending propeller shafts 50 carrying propellers 51 located at the rear of the float. At the front ends of shaft 50 are beveled gears 52. Journalled within the tank are a pair of horizontal aligned transverse shafts 53 carrying beveled gears 54 meshing with the beveled gears 52. At the outer end of shafts 53 are pulleys 56. The pulleys 56 are located directly beneath the rear wheels 56a of the vehicle. Belts 57 are passed over the pulleys 56 and wheels 56a.

It will now be understood that when the motor of the vehicle is operated, power will be transmitted through the rear wheels down to the pulleys 56, and hence to the propellers 51 for propelling the boat.

Means is provided to take up slack in the belts 57. To this end there is pivoted to the underside of the top wall 18 of the float as at 58, a lever 59 provided with a roller 59a on its lower end. The roller engages the inside of the belt 57. The lever 59 is pressed downwardly by means of springs 60 connected at the top wall of the float.

It will now be understood that the operator sitting in the usual operator's seat in the vehicle, may control the motor of the vehicle for propelling the boat.

Means is provided to steer the boat by turning the usual steering wheel of the vehicle. To this end, there is mounted at the rear of the boat, a pair of substantially parallel, vertical rods 80 carrying rudders 81, at their lower ends, located outside of the boat. Connected to each rod 80 is an arm 81a. Arms 81a are interconnected by a connecting rod 82. Located within the tank are pulleys 84 disposed on opposite sides of the arms 81a for the purpose hereinafter appearing.

Fixed to tie rod 85 of the steering gear, is a bracket 86. Mounted on wall 18, below the front axle, are pulleys 87, and mounted within the tank, below the top wall 18, are pulleys 88. Attached to bracket 86 is a cable 89 passing over one of the pulleys 87, then down through an opening in the top wall 18 of the tank, around one of the pulleys 88, and then diagonally to the opposite tank, and around one of the pulleys 87, said cable then being connected to one of the arms 81.

A second cable 90 is likewise connected to the bracket 86 and passes around the other pulley 87, down through an opening in the top wall of the tank, around the other pulley 88, and then diagonally across the tank and around the other pulley 84, said cable being connected to the other arm 81.

It will now be understood that as the steering wheel 92 is rotated, the motion is transmitted through the usual steering wheel shaft to the drag link 93, and to the tie rod 85. When the rod 85 is shifted in one direction, the rudders will be oscillated together in one direction, and when the tie rod is shifted in an opposite direction, the rudders are likewise turned in an opposite direction. The boat may thus be steered by the operator sitting in the operator's seat in the vehicle.

It will be understood that all openings in the walls of the tank are provided with leakproof bushings or packing glands.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. The combination with a float consisting of a hollow body having a platform on its upper side adapted to support a motor driven road vehicle, a shaft journaled to rotate on said float and provided with a propeller extending outwardly of the float to engage water in which the float is submerged partly, a shaft having a pulley and geared to drive the first-shaft and its propeller, said platform having an opening located above the pulley, means for raising the rear driving wheels of a motor vehicle positioned on the platform when said wheels are located in line with said opening, and a transmission belt provided with a slack take-up trained over said pulley and engageable with one of the rear wheels of the motor driven vehicle when positioned on said platform, whereby the propeller may be driven by the power plant of the motor driven vehicle.

2. The combination with a float having a platform constructed to support a motor driven vehicle and provided with openings in said platform, means for limiting the movement of a motor driven vehicle driven on said platform to cause its rear driving wheels to be stopped adjacent said openings, shafts journaled in said float below said platform and provided with pulleys located in line with said openings, separate propeller shafts having driving connection with said first-named shafts and provided with propellers extending outwardly of the float to operate in water in which the float is partly submerged, means for raising the rear wheels of a motor driven vehicle positioned in line with said platform openings, belts trained over the pulleys and engageable with the rear wheels of the motor vehicle through said openings, and a spring pressed belt tightener for each belt, to maintain the tension of the belts when trained over the rear wheels and said pulleys, whereby continuous transmission of power from said rear wheels to said pulleys is permitted.

OTTO H. MILLER.